(12) United States Patent
Marinet et al.

(10) Patent No.: US 7,146,509 B2
(45) Date of Patent: Dec. 5, 2006

(54) METHOD AND DEVICE FOR PROTECTING INTEGRATED CIRCUITS AGAINST PIRACY

(75) Inventors: Fabrice Marinet, Chateauneuf le Rouge (FR); Sylvie Wuidart, Pourrieres (FR)

(73) Assignee: STMicroelectronics SA, Montrouge (FR)

( * ) Notice: Subject to any disclaimer, the term of this patent is extended or adjusted under 35 U.S.C. 154(b) by 734 days.

(21) Appl. No.: 10/004,527

(22) Filed: Nov. 1, 2001

(65) Prior Publication Data

US 2002/0124183 A1    Sep. 5, 2002

(30) Foreign Application Priority Data

Dec. 28, 2000   (FR) .................................. 00 17261

(51) Int. Cl.
    *G06F 12/14*    (2006.01)
(52) U.S. Cl. ......................... 713/194; 713/189; 714/55
(58) Field of Classification Search ................. 713/194
    See application file for complete search history.

(56) References Cited

U.S. PATENT DOCUMENTS

| | | | |
|---|---|---|---|
| 4,317,180 A * | 2/1982 | Lies ........................... 713/321 |
| 4,742,215 A * | 5/1988 | Daughters et al. ........... 235/487 |
| 4,769,765 A * | 9/1988 | Green .......................... 700/16 |
| 4,777,662 A * | 10/1988 | Nakata ........................ 398/136 |
| 4,811,288 A * | 3/1989 | Kleijne et al. ................. 365/52 |
| 4,881,263 A * | 11/1989 | Herbison et al. ........... 713/162 |
| 4,882,752 A * | 11/1989 | Lindman et al. ............ 713/166 |
| 4,924,513 A * | 5/1990 | Herbison et al. ........... 713/161 |
| 4,965,828 A * | 10/1990 | Ergott, Jr. et al. .......... 713/193 |
| 5,014,191 A * | 5/1991 | Padgaonkar et al. ........ 711/163 |
| 5,027,397 A * | 6/1991 | Double et al. ............... 713/194 |
| 5,065,429 A * | 11/1991 | Lang ........................... 705/56 |
| 5,159,629 A * | 10/1992 | Double et al. ............... 713/194 |
| 5,243,647 A * | 9/1993 | Parikh et al. ................ 380/241 |
| 5,249,294 A * | 9/1993 | Griffin et al. ................ 713/200 |
| 5,388,267 A * | 2/1995 | Chan et al. ..................... 713/2 |
| 5,437,021 A * | 7/1995 | David et al. ................. 713/502 |
| 5,454,114 A * | 9/1995 | Yach et al. .................. 713/330 |
| 5,469,557 A * | 11/1995 | Salt et al. .................... 711/103 |
| 5,497,462 A * | 3/1996 | Schrenk ...................... 713/202 |
| 5,513,133 A * | 4/1996 | Cressel et al. .............. 708/620 |
| 5,519,843 A * | 5/1996 | Moran et al. ................ 711/103 |
| 5,544,246 A * | 8/1996 | Mandelbaum et al. ........ 705/65 |
| 5,563,799 A * | 10/1996 | Brehmer et al. ............ 702/186 |
| 5,742,530 A * | 4/1998 | Gressel et al. .............. 708/491 |
| 5,880,523 A * | 3/1999 | Candelore .................... 257/679 |
| 5,944,833 A * | 8/1999 | Ugon .......................... 713/400 |

(Continued)

FOREIGN PATENT DOCUMENTS

EP    1 022 683    7/2000

(Continued)

OTHER PUBLICATIONS

Adi Shamir, Protecting Smart Cards from Passive Power Analysis with Detached Power Supplies, Lecture Notes in Computer Science, vol. 1965, Jan. 2000, p. 71.*

(Continued)

*Primary Examiner*—Nasser Moazzami
*Assistant Examiner*—David Garcia Cervetti
(74) *Attorney, Agent, or Firm*—Lisa K. Jorgenson; Allen, Dyer, Doppelt, Milbrath & Gilchrist, P.A.

(57) ABSTRACT

Before a predetermined processing sequence, the integrated circuit detects the state of at least one timer. The circuit controls the activation of the timer if it is not activated, and disables itself if the timer is activated.

15 Claims, 4 Drawing Sheets

U.S. PATENT DOCUMENTS

| | | | |
|---|---|---|---|
| 5,949,160 A * | 9/1999 | Anderson et al. | 307/140 |
| 5,978,912 A * | 11/1999 | Rakavy et al. | 713/2 |
| 5,999,983 A * | 12/1999 | Ichimi et al. | 709/239 |
| 6,236,197 B1 * | 5/2001 | Holdsclaw et al. | 324/110 |
| 6,246,970 B1 * | 6/2001 | Silverbrook et al. | 702/117 |
| 6,249,869 B1 * | 6/2001 | Drupsteen et al. | 713/172 |
| 6,269,392 B1 * | 7/2001 | Cotichini et al. | 709/200 |
| 6,292,045 B1 * | 9/2001 | Bongiorno et al. | 327/298 |
| 6,292,898 B1 * | 9/2001 | Sutherland | 713/200 |
| 6,307,480 B1 * | 10/2001 | Sheldon et al. | 340/636.1 |
| 6,357,007 B1 * | 3/2002 | Cromer et al. | 713/194 |
| 6,507,913 B1 * | 1/2003 | Shamir | 713/200 |
| 6,587,966 B1 * | 7/2003 | Chaiken et al. | 714/34 |
| 6,618,810 B1 * | 9/2003 | Dirie | 726/27 |
| 6,625,741 B1 * | 9/2003 | Post et al. | 713/340 |
| 6,749,115 B1 * | 6/2004 | Gressel et al. | 235/382 |
| 6,839,849 B1 * | 1/2005 | Ugon et al. | 713/200 |
| 2001/0047480 A1 * | 11/2001 | Tanimoto et al. | 713/190 |

FOREIGN PATENT DOCUMENTS

| | | |
|---|---|---|
| WO | 00/42484 | 7/2000 |

OTHER PUBLICATIONS

M. Anwar Hasan, Power Analysis Attacks and Algorithmic Approaches to their Countermeasures for Koblitz Curve Cryptosystems, Lecture Notes in Computer Science, vol. 1965, Jan. 2000, p. 93.*

Christophe Clavier, Jean-Sébastien Coron, Nora Dabbous, Differential Power Analysis in the Presence of Hardware Countermeasures, Lecture Notes in Computer Science, vol. 1965, Jan. 2000, p. 252.*

Louis Goubin, Jacques Patarin, DES and Differential Power Analysis, Lecture Notes in Computer Science, vol. 1717, Jan. 1999, p. 158.*

Thomas S. Messerges et al., Investigations of Power Analysis Attacks on Smartcards, Proceedings of USENIX Workshop on Smartcard Technology, May 1999, pp. 151-161.*

* cited by examiner

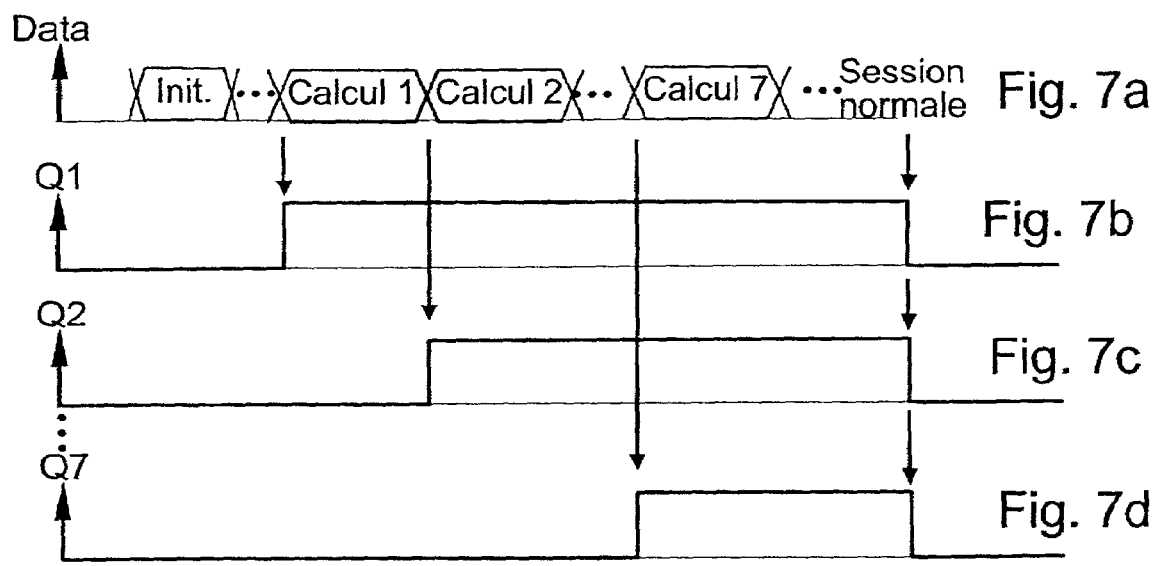

METHOD AND DEVICE FOR PROTECTING INTEGRATED CIRCUITS AGAINST PIRACY

FIELD OF THE INVENTION

This invention relates to methods and devices for protecting an integrated circuit against piracy, at least when the circuit performs operations that involve reading confidential data stored within the integrated circuit.

BACKGROUND OF THE INVENTION

Conventionally, electronic transactions carried-out on a terminal via a smart card are protected via an authentication procedure for the card, which involves an encryption algorithm. During such an authentication procedure, a terminal sends a random code to the card, and the smart card must respond by generating an authentication code, which is transformed into a random code by the encryption algorithm. The terminal calculates, on its side, the transformed random code and compares the obtained result with the one sent by the card. If the authentication code sent by the card is valid, the transaction is authorized.

In a smart card integrated circuit, an encryption algorithm is generally executed by a hard-wired logic circuit, or an encryption coprocessor, to which is attributed a secret key or an encryption key, which is stored within a protected area of the integrated circuit memory. It is therefore essential to guarantee an absolute protection of this secret key, since the encryption algorithms implemented within the authentication procedures are well known and only the secret key guarantees the tamperproof character of the authentication procedure.

However, in recent years, techniques for pirating of integrated circuits have considerably improved and nowadays involve sophisticated analysis methods based on the observation of the current used by the elements in the integrated circuit during the execution of confidential operations. Presently, there are two types of methods for analyzing the current used, namely the SPA analysis methods (Single Power Analysis) and the DPA analysis methods (Differential Power Analysis) DPA analysis methods, which are more efficient than the former methods, allow a secret key to be revealed via a single observation of changes in the current used by the encryption circuit, without having to read the data flowing in the integrated circuit internal bus and to identify the memories that are read. Such a method relies upon a correlation of samples of the current used with a mathematical model of the encryption circuit and assumptions about the secret key's value. The correlation allows the dc-component in the used current to be suppressed and consumption peaks to be revealed which show the operation performed by the encryption circuit and confidential data values. With such a method, only about 1000 samples need to be recorded for a Data Encrytpion Standard (DES) secret key to be obtained.

To counteract such piracy methods, various countermeasure methods have been suggested that allow variations in the power consumption to be hidden or scrambled, at least during the execution of confidential operations. Such countermeasures only allow increasing the number of necessary samples up to 200,000 which can still be reached by automating measurements.

SUMMARY OF THE INVENTION

Accordingly, an object of the present invention is to provide integrated circuits designed to handle confidential information, in particular those that are mounted within smart cards with an additional protection.

This object is achieved by providing a method for protecting an integrated circuit against piracy, including the following successive steps performed by the integrated circuit before a predetermined processing sequence: detecting the state of at least one timer, controlling the activation of the timer if it is not activated, and disabling the integrated circuit if the timer is activated.

According to one feature of the invention, this method further comprises the step, performed by the integrated circuit if the predetermined processing sequence has been performed normally, of deactivating the timer.

According to another feature of the invention, this method further comprises the step, performed by the integrated circuit if it is detected that the timer is activated, of modifying the value of a counter within a protected area in a non-volatile memory, comparing the value of this counter to a predefined threshold, and performing a processing for protecting confidential data stored within memories in the integrated circuit if the counted value reaches a predefined threshold.

Advantageously, said protection processing includes erasing the confidential data from the memories in integrated circuit. Specifically, the protection processing includes erasing a secret code stored within a memory in the integrated circuit. Alternatively, the protection processing includes erasing all memories in the integrated circuit.

Before executing a calculation in a sequence comprising a predefined number of calculations, the integrated circuit preferably detects the state of a respective timer, each calculation being respectively associated with one timer, controls the activation of the associated timer if it is not activated, and disables itself if the associated timer is activated. This invention also relates to an integrated circuit protected against piracy, and including at least one timer circuit comprising an activation device for activating a timer adapted to remain in the activated state as long as the circuit is powered-on and for a predetermined duration if the circuit is powered-off. Also, the integrated circuit includes a deactivating device deactivating the timer. The activated or deactivated state of the timer is also detected. The integrated circuit further includes a timer reader for reading the state of the timer, and for disabling the integrated circuit at predefined time points if the timer is in the activated state.

According to a feature of this invention, the integrated circuit deactivates the timer after a normal execution of a predetermined processing sequence.

Advantageously, each timer circuit detects the presence of a supply voltage, and allows the activation or deactivation of the timer when the supply voltage is detected as present during the predetermined time period.

According to another feature of this invention, the integrated circuit comprises several timer circuits, each timer circuit being associated with a calculation performed by the integrated circuit, the integrated circuit determining, before each calculation, the state of the timer associated with the calculation, activating the associated timer if it is not activated and disabling itself if the associated timer is activated.

Preferably, each timer circuit comprises a capacitor associated with: a discharge circuit designed so that the capacitor slowly discharges when the device is powered-off, a circuit for detecting capacitor charging, a capacitor charging controlling device, and capacitor discharging controlling device. Advantageously, capacitor discharging controlling device is designed for discharging the capacitor more rapidly than when the device is powered off.

According to yet another feature of this invention, the integrated circuit comprises a Metal-Oxide-Semiconductor (MOS) transistor having very small leakage currents, which is associated with the capacitor, so that it is only discharged by the leakage currents when the integrated circuit is powered-off. Preferably, it also comprises a test circuit, which is controlled by a test control command, for reducing the timing period. (It is noted that the "metal oxide" in MOS comes from the first devices that used a metal gate over oxide (silicon dioxide); subsequently, poly-crystalline silicon has been used for the gate, and the term MOS now at least includes both.)

BRIEF DESCRIPTION OF THE DRAWINGS

These and other objets, features and advantages of the present invention will become more apparent upon a consideration of the following description of a preferred embodiment of the invention, disclosed by way of non-limiting example in reference to the accompanying drawings, in which:

FIGS. 3a to 3e are timing diagrams showing curves of electrical signals as a function of time illustrating the operation of the circuits shown in FIGS. 2 and 2a.

FIGS. 4a to 4d are timing diagrams showing other curves of electrical signals as a function of time illustrating the operation of the circuits shown in FIGS. 2 and 2a, when the circuits are successively powered-off and then powered-on.

FIGS. 7A to 7d are timing diagrams showing curves of electrical signals as a function of time illustrating the overall operation of a modification of the integrated circuit according to this invention.

DETAILED DESCRIPTION OF THE PREFERRED EMBODIMENTS

Figure 1:
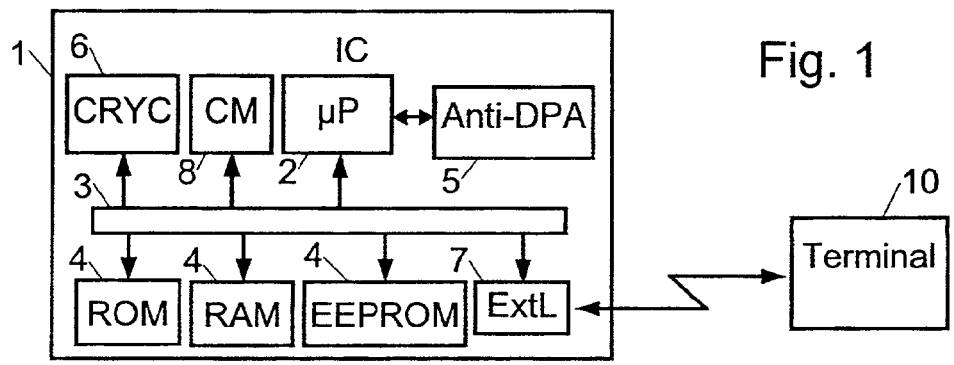
FIG. 1 is a schematic diagram showing an integrated circuit according to the invention, communicating with a terminal.

FIG. 1 diagrammatically shows the construction of an integrated circuit 1 for smart cards. This integrated circuit 1 comprises a central processor unit 2, for example a microprocessor or microcontroller, a communication unit 7 enabling communications with an external terminal 1O, an encryption circuit 6 and memories 4, namely a read only memory in which is stored the operating system of CPU 2, a Random Access Memory (RAM) memory for storing temporary data, and a programmable and erasable memory, for example an Electrically Erasable Programmable Read-Only Memory (EEPROM), for storing one or more application programs. CPU 2, memories 4, encryption circuits 6, and communication unit 7 are interconnected through a common data bus 3.

A secret key used by the encryption circuit 6 is stored within a protected area in the ROM or EEPROM memory. The integrated circuit may also comprise a countermeasure circuit 8 designed for scrambling a DPA analysis. According to the invention, the integrated circuit 1 also comprises a timer circuit 5 for more efficiently resisting a DPA attack (Differential Power Analysis).

Figure 2:
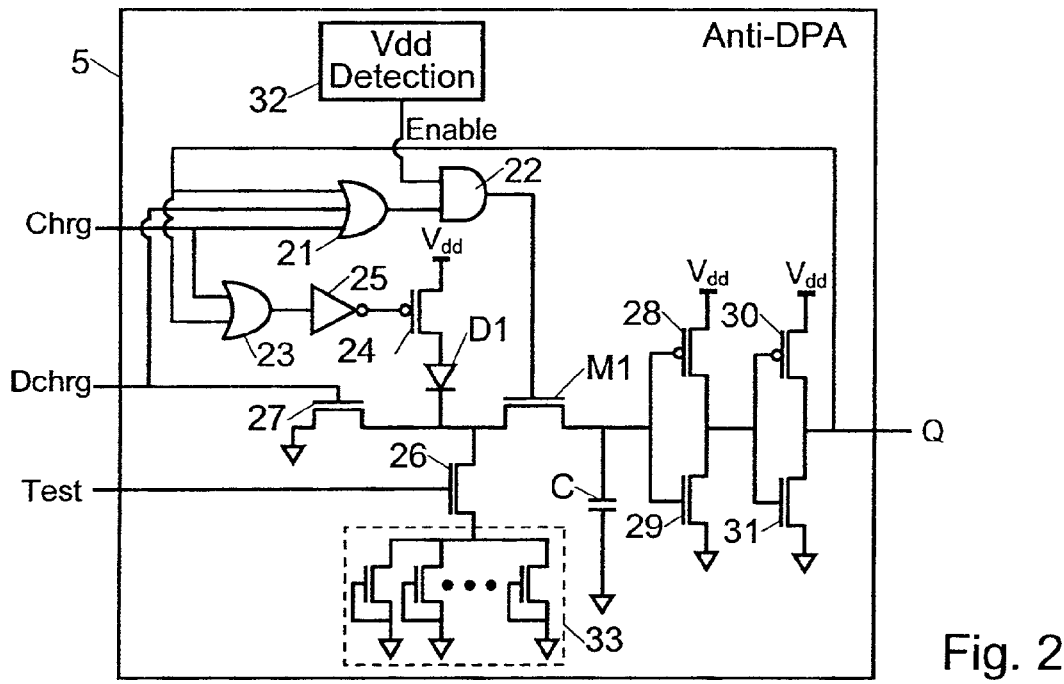
FIG. 2 is a more detailed schematic diagram of an example of the protection device according to the present invention, provided within the integrated circuit shown in FIG. 1.

In FIG. 2, this circuit 5 comprises a timer circuit, which includes an n-channel MOS (nMOS) transistor M1 advantageously designed to have a very small drain-source leakage current, i.e. of minimum drain perimeter and surface. This transistor has its drain connected to the ground through another nMOS transistor 27, the gate of which is coupled to a discharge control input Dchrg. The drain of transistor M1 is also coupled through a diode D1 reverse-connected to the drain of a p-channel MOS (pMOS) transistor 24 having its source coupled to the voltage source $V_{dd}$. The gate of transistor 24 is connected to the output of an inverter 25 whose input is connected to the output of an OR gate 23. This OR gate 23 has a first input connected to the charge control input Chrg of circuit 5, and a second input connected to output Q of circuit 5.

Thus, if output Q or charge control input Chrg is at logic level 1, the source of the transistor goes to logic level 1. Conversely, if Q and Chrg are at logic level 0, the drain of transistor M1 is isolated through diode D1, which is then in the off-state. This diode is preferably of the isolation well type, so as to be isolated from the substrate (i.e. the ground) on which is formed transistor M1, to reduce leakage currents.

Additionally, the source of transistor M1 is connected, on the one hand, to the ground through a capacitor C, and on the other hand, to output Q of circuit 5 through two series-connected inverter stages for transforming the voltage across capacitor C into a logic signal. Conventionally, each inverter stage comprises a pMOS transistor 28, 30, and an nMOS transistor 29, 31, which are series-connected between voltage source $V_{dd}$ and the ground. Transistors 21 to 31 are constructed so that a very small voltage across the capacitor provides a logic level 1 at output Q.

In addition, the gate of transistor M1 is connected to the output of an AND gate 22 whose inputs are connected to a circuit 32 for detecting supply voltage $V_{dd}$ and to the output of an OR gate 21, respectively. The OR gate 21 comprises three input channels, namely a first channel connected to output Q, a second channel connected to the charge control input Chrg, and a third channel connected to the discharge control input Dchrg.

Figure 2A:
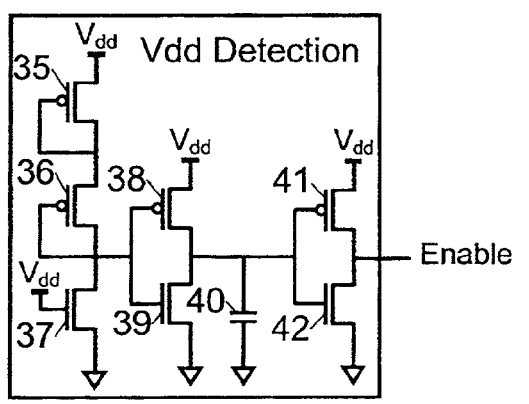
FIG. 2a is a more detailed schematic diagram of a circuit element in the device shown in FIG. 2.

FIG. 2a gives a detailed view of circuit 32 for detecting supply voltage $V_{dd}$. This circuit comprises two diode-connected pMOS transistors 35, 36 (with a gate-drain connection), both of these transistors being series-connected between voltage supply $V_{dd}$ and the drain of an nMOS transistor 37 having its gate connected to supply voltage $V_{dd}$ and its source connected to the ground, so as to act as a resistor. The junction between transistors 36 and 37 is connected to a first inverter stage comprising a pMOS transistor 38 having its source at potential $V_{dd}$ and an nMOS transistor 39 having its source connected to the ground, and this junction is connected to the gates of both transistors 38 and 39. The junction between drains of transistors 38 and 39 is connected to a capacitor 40 having its other terminal connected to the ground, and to a second inverter stage comprising a pMOS transistor 41 with its source at potential $V_{dd}$, and an nMOS transistor 42 having its source connected to the ground, the junction between the drains of both transistors 41, 42 providing an Enable output signal of circuit 32. In fact, the assembly comprising capacitor 40 and the last inverter stage with transistors 41 and 42 acts as a delay line. The operation of circuit 5 will now be explained in more detail referring to FIGS. 3 and 4, which show various signals in the integrated circuit 1 change as a function of time.

Figure 3A:
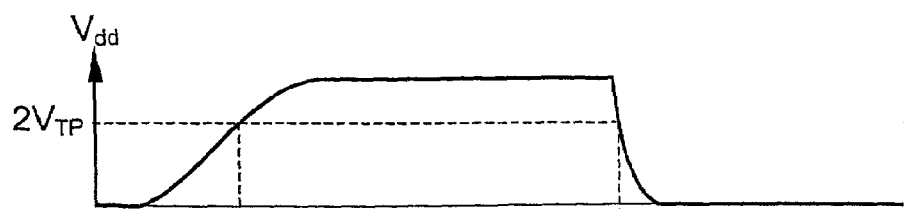
Figure 3B:
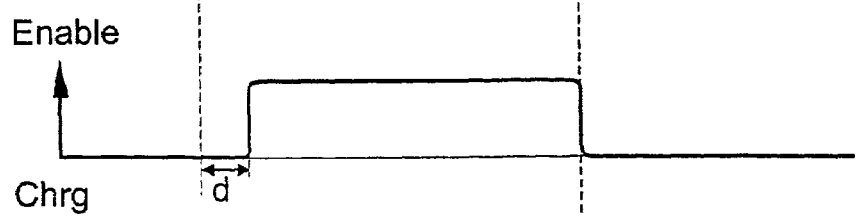
Figure 3C:
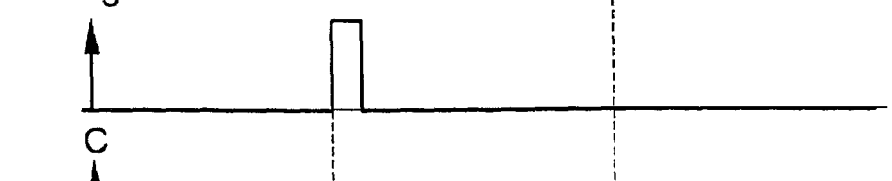
Figure 3D:
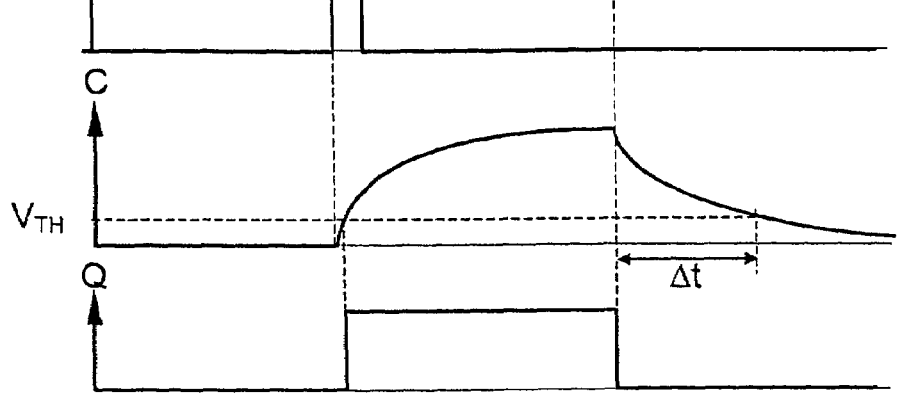
Figure 3E:
Figure 4A:
Figure 4B:
Figure 4C:
Figure 4D:
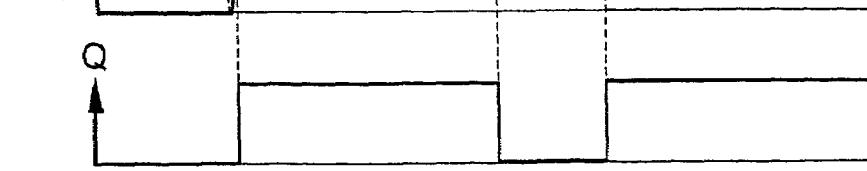

As shown in FIGS. 3a to 3e, when the circuit supply voltage $V_{dd}$ reaches a value $2V_{TP}$, where $V_{TP}$ is the ON voltage of each transistor 35, 36, signal Enable goes from low to high level after a given time delay D corresponding to the charging time of capacitor 40 (FIGS. 3a and 3b). Conversely, when voltage $V_{dd}$ decreases below $2V_{TP}$, transistors 35 and 36 are turn off, so that signal Enable goes low.

To control the charging of capacitor C, CPU 2 sends a pulse at the charge input Chrg of circuit 5 (see curve in FIG. 3c), signal Enable being high. As a result, the output of OR gate 21 goes high, as well as the output of AND gate 22. A voltage is then applied to the gate of transistor M1. Similarly, the output of OR gate 23 goes high, so that transistor 24 is turned on. The circuit supply voltage $V_{dd}$ is then applied to the drain of transistor M1, which is then on the ON state, transistor 27 being in the OFF state (with discharge command Dchrg set to 0), thus isolating the drain of transistor M1 from the ground. As a result, capacitor C charges as shown by the curve in FIG. 3d. As soon as the voltage across capacitor C becomes greater than gate voltage $V_{TH}$ that turns transistor 29 ON, with transistor 28 in the OFF-state, transistor 32 turns ON, so that output Q goes to logic level 1 (curve in FIG. 3e), which then continues the action of the charge pulse to maintain transistor M1 in the ON-state. The charge control pulse is thus chosen to be sufficiently long for the voltage across capacitor C to reach at least value $V_{TH}$.

Conversely, if the circuit is powered OFF, Enable signal goes low, so that the output of AND gate 22 goes low, which turns transistor M1 OFF. Therefore, capacitor C is no longer supplied with a voltage and discharges through the drain of transistor M1 (through the leakage current from the drain-substrate diode in the transistor). When the circuit is non longer powered, output Q follows supply voltage $V_{DD}$ and therefore falls to 0. As long as time Δt, corresponding to the capacitor discharge circuit time constant has not elapsed, the voltage across capacitor C remains greater than threshold voltage $V_{TH}$. As a consequence, as shown in FIGS. 4a to 4d, whenever the circuit is powered back on before time Δt has elapsed, transistors 28 and 30 become powered on and therefore so that output Q rises again and capacitor C automatically recharges.

Within circuit 5, the time constant Δt is the time period during which the integrated circuit 1 has to be powered-off for capacitor C to discharge. The value of Δt can be obtained from the following formula:

$$\Delta t = \frac{C\Delta V}{i} \quad (1)$$

where C is the capacitance of capacitor C, ΔV is the voltage change across the capacitor during time Δt and i is the discharge current.

If the power supply $V_{dd}$ of the integrated circuit is stopped, capacitor C slowly discharges because of the very small leakage currents which flow through transistor M1. As a consequence, even if the capacitance of capacitor C is very small, namely a few pF, the voltage across capacitor C remains greater than the triggering threshold of the inverter stages during time period Δt.

Within an MOS component, C can be 10 pF, ΔV can be 2V, and I can be 10 pA. Under these conditions, the time constant Δt equals 2 secs. Typically, with MOS technology, this time constant can be as high as 5 secs. To increase time constant Δt, several capacitors can advantageously be connected in parallel. If, while capacitor C charges, CPU 2 sends a pulse on the discharge input Dchrg, transistor 27 turns on, which connects drain of transistor M1 to the ground, so that capacitor C then discharges nearly instantaneously, both transistor M1 and 27 having a small resistance in the ON-state.

During a very short time period, it can be seen that the voltage source $V_{dd}$ is directly connected to the ground through transistor 27, diode D1 and transistor 24. This electrical mismatch is solved by overdimensioning transistor 27 and by making transistor 24 resistive (by reducing its size). In fact, this mismatch will last as long as capacitor C discharges and causes output Q to switch.

As soon as the voltage across capacitor C again falls below $V_{TH}$, transistor 28 turns on, whereas transistor 29 turns off. Transistor 30 then in turn switches to the off-state, whereas transistor 31 switches to the on state, so that output Q is connected to the ground and thus goes to logic level 0.

The length of discharge control pulse Dchrg should also be larger than the discharge time of capacitor C through transistors M1 and 27, until $V_{TH}$ is reached. It should be noted that the discharge control command is applied to OR gate 21 so as to make sure that capacitor C discharges entirely. Without this provision, the discharging of capacitor could be stopped as soon as this voltage again falls below voltage $V_{TH}$, time from which signal Q goes low again, which would disable gate 21 and therefore transistor M1.

Figure 5A:
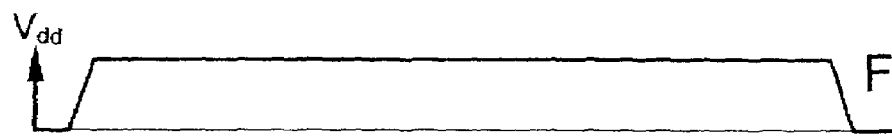
FIGS. 5a to 5f are timing diagrams showing curves of electrical signals as a function of time illustrating the overall operation of the circuit shown in FIG. 2.
Figure 5B:
Figure 5C:
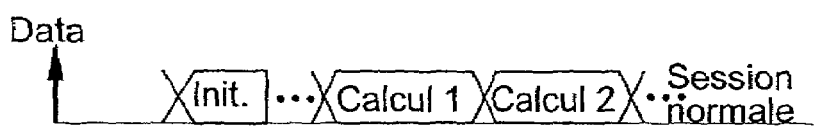

FIG. 5a shows the change in voltage $V_{dd}$ during a transaction established with the integrated circuit. Slightly after the integrated circuit is powered-on, the reset signal shown in FIG. 5b goes from logic level 0 to logic level 1, which causes an initialization process carried-out by CPU 2, and then a series of n authentication calculations, as can be seen in FIG. 5c, which shows the activity of CPU 2. After these n calculations have been performed, if they result in terminal 10 being authenticated, the CPU starts a normal operating session for performing the transaction requested by the terminal.

Figure 5D:
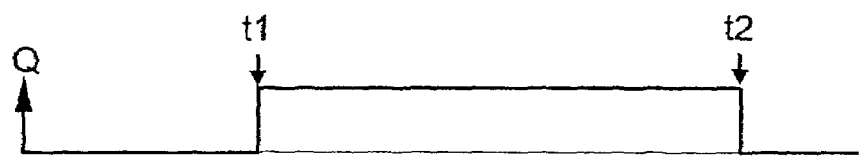

In normal operation, output Q (curve in FIG. 5d) is low when the circuit is powered-on. At the end of the initialization procedure, circuit 5 is controlled at time point t1 by CPU 2 which sends a pulse to input Chrg, so as to cause capacitor C to charge, therefore making output Q high, whereas Enable signal is high. As soon as the voltage across capacitor reaches $V_{TH}$, output Q goes low, so that the gate and source voltages of transistor M1 are maintained at high level. Capacitor C therefore remains charged and signal Q is maintained at high level.

Figure 5E:
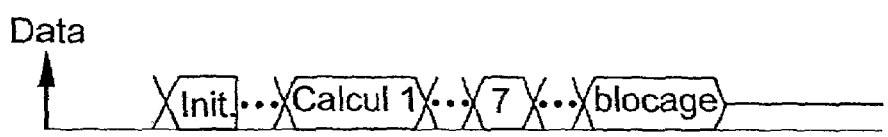
Figure 5F:

If the authentication calculations (FIG. 5c) result in the terminal being authenticated, CPU 2 controls the discharging of capacitor C by sending a pulse on the discharged control input Dchrg, and output Q again goes low at time point t2. On the contrary, if, during the authentication calculations, CPU 2 detects abnormal operation due to a piracy attempt, it does not perform a capacitor discharge control, for example, within an idling loop (FIGS. 5e, 5f).

Figure 6A:
FIGS. 6a to 6d are timing diagrams showing curves of electrical signals as a function of time illustrating the overall operation of the circuit shown in FIG. 2, in the case when the circuit is powered back on after a malfunction is detected.
Figure 6B:
Figure 6C:
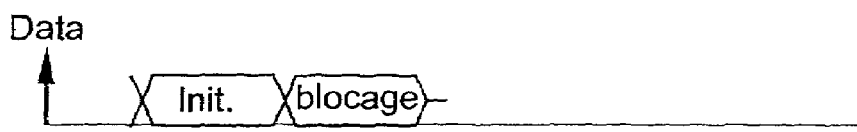
Figure 6D:

If, thereafter, an attempt is made to reset circuit 1 by powering it off for a short duration smaller than the discharge time of capacitor C, CPU 2, which executes the initialization procedure, detects that signal Q is still high, which indicates that capacitor C is not entirely discharged and disables itself (FIG. 6c). Therefore, to entirely reinitialize circuit 1, it is necessary to wait for at least Δt, so that the component can be restarted under normal conditions.

During a DPA analysis of the integrated circuit, therefore, it is necessary to wait until capacitor C is discharged between each acquisition sequence of current measurement samples, which considerably lengthens the time taken to carry-out such an analysis.

To entirely suppress the possibility that such an analysis be performed, a provision can be made so that, before each disabling operation, CPU 2 increments a disable counter stored within the EEPROM memory and indefinitely disables itself when the counted value reaches or exceeds some predefined threshold. The indefinite disabling of the integrated circuit can for example include erasing the secret key that is stored within the EEPROM memory, or more generally, in erasing all confidential data stored within this memory, or else, the whole contents thereof.

A further provision can also be to connect the drain of transistor M1 to an nMOS transistor 26 having its gate connected to a test control input and its source connected to a circuit 31 comprising a plurality of nMOS transistors connected in parallel between the source of transistor 26 and the ground, these transistors being connected in the off-state (with their gate grounded). These transistors have the same size as transistor M1, so that the leakage current which discharges capacitance C is n times greater than that of M1, where n is the number of transistors in circuit 33. This circuit 33 therefore allows time constant Δt=RC of the timer circuit to be reduced to a value that will allow tests to be performed on integrated circuit 1 (where R corresponds to the resistance of circuit 33 and C is the capacitance of capacitor C).

Of course, the test command should be made sufficiently inaccessible so that it could not be executed by possible pirates.

According to a modification of the present invention, several timer circuits 5 can be provided within integrated circuit 1, such as one circuit per authentication calculation sequence. As shown in FIGS. 7a to 7d, instead of instructing the charging of capacitor C during the initialization sequence performed by CPU 2, each calculation sequence comprises an instruction to read the value of output signal Qi from the associated timer circuit 5 and then, if this signal is high, an instruction to discharge the capacitor in this circuit, so as to make signal i high, as shown in FIGS. 7b to 7d.

In this way, if the same calculation sequence is requested twice during the same authentication procedure without powering-off circuit 1 for a sufficient time period, CPU 2 detects it by reading the value of signal Qi corresponding to the calculation sequence, and disables itself.

The invention claimed is:

1. A method of protecting an integrated circuit against piracy, the integrated circuit comprising a central processing unit (CPU) and at least one associated timer, the method comprising:
   at the CPU, performing an initialization processing sequence;
   at the CPU, detecting the state of the at least one timer after performing the initialization processing sequence and before performing a predetermined processing sequence;
   if the at least one timer is not activated, activating the at least one timer and performing the predetermined processing sequence; and
   if the at least one timer is activated, disabling the integrated circuit.

2. The method according to claim 1, further comprising the CPU deactivating the at least one timer after performance of the predetermined processing sequence.

3. The method according to claim 1, further comprising:
   the CPU modifying the value of a counter within a protected area in a non-volatile memory if it is detected that the at least one timer is activated;
   the CPU comparing the counted value with a predefined threshold; and
   the CPU performing a process for protecting confidential data stored within memories in the integrated circuit if the counted value reaches the predefined threshold.

4. The method according to claim 3, wherein the protection process comprises erasing the confidential data from the memories in the integrated circuit.

5. The method according to claim 3, wherein the protection process comprises erasing a secret code stored within a memory in the integrated circuit.

6. The method according to claim 3, wherein the protection process comprises erasing all memories in the integrated circuit.

7. The method according to claim 1, wherein the at least one timer comprises a plurality of timers each being associated with a respective authentication calculation of a sequence of a predefined number of calculations; and further comprising:
   the CPU detecting the state of a respective timer before performing an associated calculation,
   the CPU activating the respective timer if it is not activated; and
   the CPU disabling the integrated circuit if the respective timer is activated.

8. An integrated circuit (IC) comprising:
   a central processing unit (CPU); and
   at least one timer circuit for protecting the IC against piracy and comprising
      a timer which is activated when the IC is powered-on and for a predetermined duration when the IC is powered-off,
      a timer activating circuit for activating the timer,
      a timer deactivating circuit for deactivating the timer, and
      a detection circuit for detecting the state of the timer;
   the CPU detecting the state of the timer after performing an initialization processing sequence and before performing a predetermined processing sequence, and, if the timer is not activated, activating the timer and performing the predetermined processing sequence; and
   the CPU disabling the IC at predefined times if the timer is in the activated state.

9. The integrated circuit according to claim 8, wherein the CPU deactivates the timer after normal execution of the predetermined processing sequence.

10. The integrated circuit according to claim 8, wherein each timer circuit further comprises:
    a power supply detection circuit for detecting a power supply; and
    a timer control device for allowing the timer to be activated or deactivated when the power supply is detected during a predetermined time period.

11. The integrated circuit according to claim 8, wherein the at least one timer circuit comprises a plurality of timer circuits each being associated with an authentication calculation performed by the CPU; and wherein the CPU determines, before each calculation, the state of the associated timer, and activates the associated timer if it is not activated, and disables the IC if the associate timer is activated.

12. The integrated circuit according to claim 8, wherein the at least one timer circuit comprises:
   a capacitor;
   a discharge circuit associated with the capacitor and designed to discharge over the predetermined duration when the IC is powered-off;
   a circuit for detecting capacitor charging;
   a capacitor charging control circuit; and
   a capacitor discharging control circuit.

13. The integrated circuit according to claim 12, wherein the capacitor discharging control circuit discharges the capacitor faster than when the IC is powered-off.

14. The integrated circuit according to claim 12, wherein the at least one timer circuit further comprises a MOS transistor associated with the capacitor so that it is only discharged by a leakage current when the IC is powered-off.

15. The integrated circuit according to claim 8, further comprising a test circuit for reducing the predetermined duration of the timer during a testing procedure.

* * * * *